United States Patent [19]

Heiremans et al.

[11] 4,181,239
[45] Jan. 1, 1980

[54] PLASTICS CONTAINER FOR PRESSURIZED CARBONATED BEVERAGES

[75] Inventors: Robert Heiremans, Mariakerke; Andre Depuydt, Ieper, both of Belgium

[73] Assignee: U C B, Societe Anonyme, Saint-Gilles-lez-Bruxelles, Belgium

[21] Appl. No.: 884,393

[22] Filed: Mar. 8, 1978

[30] Foreign Application Priority Data

Mar. 8, 1977 [GB] United Kingdom ............... 9712/77

[51] Int. Cl.² .................... A21D 10/02; B65D 25/16; B65D 5/56; D03D 13/00
[52] U.S. Cl. ............................... 220/461; 220/414; 220/453; 426/127; 428/35; 428/36; 428/215; 428/222
[58] Field of Search ............... 220/414, 415, 453, 461; 426/127, 106; 428/35, 36, 222, 215, 480, 484, 483, 486, 474

[56] References Cited

U.S. PATENT DOCUMENTS

| | | | |
|---|---|---|---|
| 3,403,048 | 9/1968 | Grimm et al. | 428/484 |
| 3,524,779 | 8/1970 | Masters et al. | 156/320 |
| 3,622,439 | 11/1971 | Manne et al. | 428/483 |
| 3,687,351 | 8/1972 | Kaercher et al. | 138/144 |
| 3,907,735 | 9/1975 | Hollstein | 428/478 |
| 3,923,190 | 12/1975 | Roth | 428/474 |
| 3,949,114 | 4/1976 | Viola et al. | 428/483 |
| 3,956,544 | 5/1976 | Harrington | 426/127 |
| 3,977,153 | 8/1976 | Schrenk | 426/127 |
| 3,980,107 | 9/1976 | Barnes | 138/144 |
| 4,082,854 | 4/1978 | Yamada et al. | 426/127 |
| 4,105,818 | 8/1978 | Scholle | 426/127 |
| 4,107,362 | 8/1978 | Valyi | 428/483 |
| 4,126,262 | 11/1978 | Thompson et al. | 428/215 |

*Primary Examiner*—William R. Dixon, Jr.
*Attorney, Agent, or Firm*—Wenderoth, Lind & Ponack

[57] ABSTRACT

A cylindrical container body for packaging pressurized carbonated beverages, comprising (a) at least one film of a synthetic or semi-synthetic organic polymer having a permeability to oxygen lower than $6 \times 10^{-13}$ ml.cm/cm².sec.cm of mercury at 25° C. and 0% relative air humidity; (b) at least two films of a polyester; and (c) at least two layers of an organic thermoplastic binder having a permeability to water vapor lower than $1 \times 10^{-14}$ g.cm/cm².sec.cm of mercury at 38° C. and 90% relative air humidity, all the films of (a) and (b) being adhesively bonded together by means of the binder of (c) in the form of a cylindrical body, the wall of which has a spirally or convolutely wound structure, in which each film of (a) is separated both from the outside surface and from the inside surface of the cylindrical body by at least one film of (b) and at least one layer of (c), and containers comprising said cylindrical body and provided with top and bottom end closures at the opposite ends thereof.

21 Claims, 8 Drawing Figures

PLASTICS CONTAINER FOR PRESSURIZED CARBONATED BEVERAGES

The present invention relates to a container for packing beer and other pressurized carbonated beverages, this container being, in particular, a can, a novel characteristic of which is that the cylindrical body thereof is entirely made of plastics material.

There is a general tendency to replace glass by other materials for containers intended for packing liquids. In the case of still beverages, i.e. those not containing a gas under pressure, glass bottles are being increasingly replaced by bottles of plastics material, which are lighter and which have the advantage that they can be thrown into the dustbin after use, unlike glass bottles which are normally taken back by the beverage manufacturer for the purpose of re-use after washing. In order to permit competition with the glass bottle, the bottle of plastic material is given the smallest possible wall thickness, having regard to the cost of plastics materials, which is several times that of glass; by this and other means, for example by increasing the capacity of the plastics bottle in comparison with that of the glass bottle, the plastics material:beverage cost ratio becomes comparable with that of glass:beverage.

However, in the case of packing beverages containing gas under pressure, usually carbon dioxide ($CO_2$), the problem is quite different. In order to be able to withstand the pressure of the gas inside the bottle, which may amount to several $kg/cm^2$, it is essential to increase the wall thickness of the bottle of plastics material; consequently, this bottle is no longer competitive with the glass bottle, particularly as other factors favoring glass are involved, such as the better impermeability of glass to the carbon dioxide inside the bottle and to the air outside the bottle, as compared with the vast majority of plastics materials at present available commercially, while, in addition, glass is a material which is completely devoid of toxicity, which is far from always being the case with plastics materials. These different aspects of the problem will be examined in greater detail hereinbelow.

Another form of packing which competes with traditional glass packing for beverages containing gas under pressure is the cylindrical metal can, of the type already well known for preserving meat, vegetables, fruit, milk and the like. For example, the cylindrical metal can for packing carbonated beverages generally has a capacity of from about 25 to about 48 centiliters. The ratio between the weight of the packing and that of the beverage, while lower than the ratio of the weight of the packing to that of the beverage in the case of a glass bottle of the same capacity, is, nevertheless, high. Another disadvantage of the metal can is that, once emptied and thrown away with refuse, it occupies a considerable volume, on the one hand, and, on the other hand is practically indestructible, thus giving rise to serious ecological problems. It is for this reason that attempts have been made to discover substitute materials for metals for the production of this type of can.

Various Patents describe cans of this kind in which the conventional metal (tin-plated steel, aluminum or the like) is partly replaced by non-metallic material for the production of the cylindrical can body. In U.S. Pat. No. 3,687,351, the cylindrical body comprises (a) a thick, strong foil of aluminium or steel which constitutes the inner wall of the body, (b) a middle layer of cardboard provided on both sides with a layer of adhesive and (c) an outer extruded layer of plastics material. In U.S. Pat. No. 3,980,107, the wall of the cylindrical body comprises (a) an inner liner comprising, from inside to outside, a polyester film, an adhesive layer of polyethylene, a foil of aluminum and a layer of polyethylene terephthalate-modified vinyl varnish, (b) an outer jacket of a rigid material composed of two layers of cardboard separated by a layer of polyethylene and (c) a paper label stuck to the outer face of the jacket. These cans, while constituting technical progress in respect of the improvement of the ratio of the weight of the packing to the weight of beverage, still contain a metal foil which does not entirely solve the problem of environmental pollution. It will be noted that the metal foil used up to the present time for either entirely metallic or partially metallic cans plays an important multiple role, namely, it constitutes a fluid-tight barrier preventing the passage of gases and liquids through the wall of the container and it provides the mechanical strength properties necessary for this type of packing.

The ideal would obviously be for the cylindrical body of the can to be entirely composed of a material other than metal, which material would be completely destructible by incineration or by atmospheric agents, the problem of pollution thereby being radially solved. Only the metal end closures constituting the bottom and top of the container would, therefore, remain as residue and these represent only a negligible fraction of the entire can, both as regards weight and as regards volume; if desired, these covers could even be made of plastics material, which would completely solve the problem of pollution.

However, the difficulty is to find a material capable of completely replacing the metal foils used up to the present time for the cylindrical body of the can. This material would have to comply with the following requirements:

(1) be completely devoid of toxicity, i.e. physiologically acceptable;

(2) be organoleptically neutral, in order not to impair the taste properties of the packed cardboard beverage;

(3) be sufficiently impermeable to gases, particularly to oxygen, carbon dioxide and water vapor, to enable the packed beverage to retain its original properties intact for at least one year;

(4) be able to withstand the internal pressure of the gases, which may attain 10 $kg/cm^2$ for beverages which are not pasteurized in their packing and 15 $kg/cm^2$ for those which are;

(5) be able to withstand the pasteurization temperature, which is of the order of 70° C.;

(6) be able to withstand creep so that the can will not increase in volume, which would entail a loss of carbon dioxide in the beverage through expansion and consequently an organoleptical deterioration;

(7) be able to withstand shocks, crushing and bursting in the course of storage and transport;

(8) have as small a thickness as possible so as to have a ratio of weight of packing to weight of beverage which is as low as possible so that the cost price of the packing can thus be reduced and, at the same time, facilitate heat exchange in the course of pasteurization;

(9) be able to take printing by usual printing methods;

(10) be able to be incinerated or destroyed by atmospheric agents after use, without liberating toxic vapors or gases into the atmosphere.

When the properties of plastics materials in general are examined systematically, it is found that none of them gives entire satisfaction in respect of all the above-mentioned requirements at one and the same time. In order to achieve the desired aim of completely replacing metal foils by plastics materials, it is, therefore, necessary to select a plurality of species of these materials so that, through their simultaneous use, a composite material will be obtained which complies with all the requirements indicated above. Assuming that such a selection is possible, it is, in addition, necessary that the plastics materials thus selected should be compatible with one another. If they are not, the problem of making these plastics materials compatible with one another by means still to be found will, therefore, arise. In addition, the order in which these various plastics materials are superimposed on one another in the cylindrical wall of the can must be strictly established. Furthermore, the thickness of each of these plastics materials, which is critical for obtaining the desired properties, and also the total thickness of the wall of the cylindrical body of the resulting can must not be so great that the cost of this composite material would become prohibitive. According to another aspect, it is necessary for this composite material to be able to be produced in conventional machines for making cylindrical bodies in order to avoid investment costs which will be technically and economically impossible. In the same spirit, the cylindrical body thus obtained must be capable of closure, without special difficulty, by bottom and top end closures in conventional machines designed for the purpose. Finally, assuming that the two conditions mentioned above in connection with machines for making the can are satisfied, it is still necessary for the can obtained to be able to be used by the manufacturer of carbonated beverages on conventional can filling machines. It can, therefore, be seen that the desired aim encounters a considerable number of difficulties in its achievement which explains why, as far as we are aware, no cans for the packing of carbonated beverages are at present known, the cylindrical body of which is entirely made of one or more plastics materials and, therefore, entirely without using traditional materials, such as metals, cardboard, textiles and the like.

We have now discovered that, by using clearly determined plastics materials and, at the same time, selecting a clearly determined construction technique, it is possible to produce cylindrical container bodies for packaging pressurized carbonated beverages which are made entirely of synthetic or semisynthetic organic polymers and which comply with all the technological, economic and ecological requirements indicated above in (1) to (10).

The present invention, therefore, provides a cylindrical container body for packaging pressurized carbonated beverages, this cylindrical body comprising as component elements:
(a) at least one film of a synthetic or semi-synthetic organic polymer having a permeability to oxygen lower than $6 \times 10^{-13}$ ml.cm/cm$^2$.sec.cm of mercury at 25° C. and 10% relative air humidity;
(b) at least two films of a polyester; and
(c) at least two layers of an organic thermoplastic binder having a permeability to water vapor lower than $1 \times 10^{-14}$ g.cm/cm$^2$.sec.cm of mercury at 38° C. and 90% relative air humidity,
all the films of (a) and (b) being adhesively bonded together by means of the binder of (c) in the form of a cylindrical body, the wall of which has a spirally or convolutely wound structure, in which each film of (a) is separated both from the outside surface and from the inside surface of the cylindrical body by at least one film of (b) and at least one layer of (c).

The present invention relates also to a container for packaging pressurized carbonated beverages which comprises the cylindrical body according to the present invention provided with top and bottom end closures at the opposite ends thereof.

According to the present invention, the synthetic or semi-synthetic polymer used in the form of a film of element (a) must have a permeability to oxygen lower than $6 \times 10^{-13}$ ml.cm/cm$^2$.sec.cm of mercury at 25° C. and at 0% relative air humidity. It is essential that atmospheric oxygen should not be able to come into contact with the pressurized beverage stored in the container according to the present invention, in view of the well known harmful action of oxygen on preservation and on the organoleptic properties of beverages such as beer, lemonades, and the like. The barrier properties towards oxygen vary considerably from one polymer to another. It is, therefore, necessary to choose from the polymers those which are the most effective and the permeability of which to oxygen is lower than the value indicated above because, otherwise, it would be necessary to use in the container of the present invention thicknesses of the element (a) such that this type of packaging would become too expensive and unsuitable for the intended purpose. For this reason, according to the present invention, the synthetic or semi-synthetic organic polymer of element (a) is preferably selected from polyvinyl alcohol and copolymers containing at least 70% by weight of vinyl alcohol units, regenerated cellulose, polyacrylonitrile and polymethacrylonitrile and also copolymers containing at least 65% by weight of acrylonitrile or methacrylonitrile and copolymers of vinylidene chloride containing at least 85% by weight of vinylidene chloride units, the permeability of which to oxygen is of the following order of magnitude:

| | Permeability to oxygen (ml.cm/cm$^2$ sec.cm Hg at 25° C. and 0% relative air humidity |
|---|---|
| Polyvinyl alcohol | $6.24 \times 10^{-17}$ |
| Vinyl alcohol copolymers | about $1.5 \times 10^{-14}$ |
| Regenerated cellulose | $8.94 \times 10^{-14}$ |
| Poly(meth)acrylonitrile | about $2.2 \times 10^{-14}$ |
| Copolymers of (meth)acrylonitrile | about $5 \times 10^{-13}$ |
| Copolymers of vinylidene chloride | about 2 to $5 \times 10^{-13}$ |

Examples of copolymers of vinyl alcohol include those containing at most 30% by weight of ethylene, vinyl acetate or the like.

Examples of copolymers of acrylonitrile and copolymers of methacrylonitrile include those containing at most 35% by weight of styrene, methyl methacrylate, butadiene or the like.

Examples of copolymers of vinylidene chloride include those containing at most 15% by weight of acrylonitrile, methyl methacrylate, itaconic acid or the like.

Among the polymers used in accordance with the present invention as element (a), particular preference is given to polyvinyl alcohol, vinyl alcohol copolymers and regenerated cellulose, particularly polyvinyl alcohol, taking into account, in this particular selection, not only the factor of impermeability to oxygen but also other considerations, such as physiological innocuousness and mechanical properties, including tensile strength, resistance to creep and the like.

The polymers used as element (a) in the present invention are commercially available in the form of films of different thickness. These films may optionally be biaxially oriented.

In view of the fact that the polymers, such as polyvinyl alcohol, regenerated cellulose and poly(meth)acrylonitrile, are sensitive to humidity with a simultaneous decrease in their barrier properties towards oxygen with increasing absorption of humidity, certain manufacturers sell these types of films provided with a thin coating of polymer forming a humidity barrier, for example a coating of polyvinylidene chloride. It is understood that such coated films may obviously also be used in the present invention as element (a).

Depending on the particular barrier properties towards oxygen of the films used as element (a), one or more of these films may be used for the construction of the cylindrical body of the container according to the present invention.

It will be noted that element (a) acts, at the same time, as a barrier impermeable to carbon dioxide released by the pressurized beverage which is stored inside the container according to the present invention. The criterion of permeability to oxygen required to be possessed by element (a), i.e. the requirement that it should be lower than $6 \times 10^{-13}$ ml.cm/cm².sec.cm Hg, is sufficient to prevent, at the same time, the escape of carbon dioxide in the opposite direction into the atmosphere through the wall of the can according to the present invention.

The element (b) is composed of a plurality of polyester films, the term "polyester" being understood to mean a polycondensation product of terephthalic acid with an alkylene glycol, such as ethylene glycol, butylene glycol, cyclohexylene-1,4-dimethanol or the like, while a minor proportion of the terephthalic acid may also be replaced by another polybasic carboxylic acid. An example of such as polyester film is "Mylar" sold by E. I. du PONT de NEMOURS & Co. The polyester film is preferably a biaxially oriented polyethylene terephthalate film, having regard to the vastly superior mechanical properties of the oriented films as compared with those of the corresponding unoriented films. The role of the element (b) in the cylindrical body of the present invention is very important because it is this element which, at the same time, supplies the properties of resistance to the internal pressure of the gases in the can, to creep, to shock, to crushing and to heat and the rigidity of the cylindrical body of the can. In addition, the polyester is completely devoid of toxicity and is organoleptically neutral, which makes it possible for it to be used advantageously (but not obligatorily) as the internal film of the cylindrical body which comes into direct contact with the pressurized beverage.

According to the present invention, the element (c) is composed of a plurality of layers of an organic thermoplastic binder, the permeability of which to water vapor is less than $1 \times 10^{-14}$ g.cm/cm².sec.cm of mercury at 38° C. and at 90% relative air humidity. The element (c) serves two purposes, namely, on the one hand, bonding together adhesively the films of elements (a) and (b) used as construction material for the cylindrical body of the present invention and, on the other hand, constituting a humidity-tight barrier, taking into account any sensitivity of element (a) to water, as explained above. In addition thereto, the element (c) must have a sufficiently high softening temperature to enable the cylindrical body of the can according to the present invention to withstand the action of heat, either in the course of storage or in the event of the pasteurization of the beverage when the latter is already within the can. It is for this reason that the element (c) preferably has a softening temperature of at least 60° C. and advantageously of at least 80° C. In addition, the element (c) must have, in the molten state, a sufficiently low viscosity for it to be spread without difficulty in layers of a few microns thickness on the films of elements (a) and (b) which are to be adhesively bonded. Examples of element (c) include the adhesive compositions technically known as "hot melts" and which contain one or more of the three components (i), (ii) and (iii):

(i) a synthetic polymer selected from polyethylene, an ethylene-vinyl acetate copolymer, an ethylene-propylene-diene terpolymer, polyisobutylene, polypropylene, a polyamide or a polyester;

(ii) a natural or synthetic adhesive resin having a low molecular weight, such as polyterpenes, phenolic terpenes, terpene-urethane resins, phenolic resins, natural or modified rosin or resinous styrene copolymers;

(iii) a water-repellent wax, such as the paraffins and microcrystalline waxes, preferably the latter, the presence of this component (iii) being compulsory in the element (c).

The components (i), (ii) and (iii) are selected as regards their nature and weight in such a manner that the properties indicated above of the element (c) are complied with. Various non limiting compositions of the element (c) are mentioned in the Examples illustrating the present invention.

The elements (a), (b) and (c) described above are the essential, indispensable elements for the construction of the cylindrical body of the container of the present invention. Nevertheless, for reasons such as the reduction of the cost of the container, the desire for decorative effects or the temporary scarcity of one or both of the elements (a) and (b), it is possible, while remaining within the scope of the present invention, to use, in addition, at least one element (d) which is at least one film of organic polymer different from the films of elements (a) and (b). The element (d) includes various films of an organic polymer in current use in the packaging industry, while, by way of example, mention may be made of a preferably biaxially oriented polypropylene film, a paper entirely or partly composed of synthetic fibres, and particularly the film known as "spun-bonded" or the like.

When, for the construction of the cylindrical body, the element (d) is simply added to the elements (a), (b) and (c), no particular problems are encountered because the elements (a), (b) and (c) comply by themselves with the requirements indicated for the cylindrical body of the container. If, on the other hand, the element (d) partially replaces the element (b), it must be of such a nature and used in such a quantity that the cylindrical body will have the same mechanical properties as in cases where the element (b) is used in the absence of the element (d), these mechanical properties being resistance to the internal pressure of gases in the container filled with the pressurized beverage, resistance to creep, resistance to shocks, resistance to crushing, resistance to heat and rigidity.

As previously indicated, the elements (a), (b) and (c) and optionally (d) are assembled in such a manner that the cylindrical container body has a spirally or convolutely-wound structure. The technique of constructing tubular bodies by spiral winding, which consists in forming a tubular body by driving a plurality of continuous, helicoidally wound strips one over the other on a mandrel, is known per se and has been described in patent literature (see, for example, U.S. Pat. Nos. 3,980,107; 3,687,351; 3,960,624 and 3,524,779; and British patent specification No. 1,432,788). Each strip of film considered individually is wound helicoidally on the mandrel with its edges abutting or overlapping. The various strips constituting the cylindrical container body are superimposed on one another helicoidally so that the joining edges of one strip are staggered with respect to the joining edges of another in the longitudinal direction of the mandrel. In this way, the joints of each strip will be covered by the strip directly superimposed on it, thus ensuring tightness. The element (c) is used for bonding the strips to one another.

In the convolute construction of the cylindrical container body, the strips of component films are discontinuous and their width is about one to several times (in the case of cutting-off) the height of the cylindrical body which is to be built. The first strip is wound one or more times over itself on the mandrel, then the second strip is wound over or together with the first, whereupon the third strip is wound over or with the second and so on, the joint of each strip being overlapped by the following strip in order to achieve tightness. Here again, the element (c) is used for bonding the various strips. Reference is made to such convolutely-wound structures in the above-mentioned U.S. Pat. No. 3,524,779 among other publications. It will be noted that in the above-mentioned Patents, as example of spirally or convolutely-wound structure, mention is made of combinations of materials which differ from the combination of the elements (a), (b) and (c) according to the present invention.

As hereinbefore indicated, the element (c) is preferably a so-called "hot melt" adhesive composition. The application of the element (c) over the films of elements (a) and/or (b) is preferably effected just before the formation of the cylindrical body according to the present invention by spiral winding on the mandrel. This technique of application of the "hot melt" composition is described in the following articles: WENDELL T. KOPP, Hot Melt Equipment, Package Printing and Diecutting, September 1974, pages 10, 11, 92, 94, 95; ibidem, October 1974, pages 12 to 14.

In the cylindrical container body according to the present invention, the position of the elements (a), (b), (c) and optionally (d) is strictly determined. As indicated above, each film of element (a) is separated both from the outside surface and from the inside surface of the cylindrical body by at least one film of element (b) and by at least one layer of element (c). Since the element (c) is, at the same time, a barrier against humidity, each film of element (a) is perfectly protected from humidity which may arise from the outer atmosphere and from humidity and also the liquid of the pressurized beverage present inside the cylindrical body of the container.

When using only elements (a), (b) and (c) for the construction of the cylindrical body according to the present invention, the outside surface and also the inside surface of the cylindrical body will always each be composed of a film of element (b) which, with the aid of the element (c), is adhesively bonded either to one or more other inner films of element (b) and/or to one or more inner films of element (a).

When using the optional element (d), in addition to the obligatory elements (a), (b) and (c), the optional element (d) can occupy any position inside the wall of the cylindrical body or outside that wall. Nevertheless, if the optional element (d) is a physiologically and organoleptically acceptable organic polymer it may also constitute the inside surface of the cylindrical body which comes into direct contact with the pressurized beverage.

An important factor for the cylindrical body according to the present invention is the thickness of its wall, because it governs, at the same time, the upper thickness limits of the elements (a), (b), (c) and, where applicable, (d). The wall thickness must be sufficient to ensure the required strength of the container built with the cylindrical body while, at the same time, ensuring perfect preservation of the pressurized beverage for a period of at least one year. On the other hand, the wall thickness must not be so great as to lose the advantage of the low density of plastics materials in general or to increase excessively the weight and cost of this type of packaging. That is why, according to the present invention, the wall thickness of the cylindrical body is generally between 85 and 770 microns and preferably between 100 and 400 microns.

The thickness of the element (a) in the cylindrical body of the present invention depends on its degree of imperviousness to oxygen. The greater is this imperviousness, the smaller the thickness of the element (a) may be. Depending upon circumstances, the element (a) may be composed of one or more films, depending, in particular, upon the thickness of the films of element (a) available commercially. The total thickness of element (a), in one or more films, is generally within the range of from 10 to 250 microns. In the particular and preferred case of using polyvinyl alcohol or its copolymers as element (a), the thickness of this element is preferably 10 to 80 microns.

The thickness of element (b) in the cylindrical body of the present invention is dependent upon the mechanical properties which the packing container is required to possess. The element (b) is composed of at least two films protecting the element (a) on each side, the number of these films of element (b) likewise being dependent upon the thicknesses of the films of element (b) available on the market. The total thickness of element (b), in two or more films, is generally within the range of from 35 to 250 microns and preferably from 35 to 180 microns.

The thickness of element (c) in the cylindrical body of the present invention must be sufficient both to ensure good adhesive bonding of the films of elements (a) and/or (b) to one another and to constitute an effective barrier against humidity, both on the atmosphere side and on the pressurized beverage side inside the can. The number of layers of element (c) is obviously dependent upon the number of films of element (a) and of element (b) to be bonded, while the total thickness of element (c), governed by its imperviousness to humidity, is generally within the range of from 40 to 70 microns and preferably from 50 to 65 microns.

The thickness of element (d), when such an element is optionally employed in the cylindrical body of the present invention, depends essentially upon its mechanical properties and on its barrier properties towards oxygen and carbon dioxide. It is well known that the mechanical properties may vary considerably from one polymer to another and it is for this reason that it is practically impossible to attribute a precise limit to the thickness of the element (d) which may be employed. The essential criterion is, nevertheless, that the thickness of element (d) optionally used must not compromise either the mechanical properties or the barrier properties towards oxygen and carbon dioxide which are provided for the cylindrical body by the element (a). In general, the thickness of element (d) may be up to 200 microns.

The container comprising the cylindrical body according to the present invention as well as top and bottom end closures at the opposite ends thereof, is constructed by the conventional techniques in the pressurized beverage canning industry. These closing elements are, consequently, mounted on the cylindrical body according to the present invention in conventional automatic machines with the aid of known processes of adhesive bonding, heat-sealing and particularly by crimping, this last-mentioned process being particularly preferred for the packaging of carbonated beverages under pressure, because of its high production rate.

Similarly, the cylindrical body according to the present invention lends itself, without difficulty, to the various conventional manners of decoration of cans for pressurized beverages. Thus, metallized or non-metallized paints, varnishes, inks, printing type and the like can be applied to the recto or verso of the last and/or penultimate strips of the cylindrical body, these being composed, according to the present invention, of an element (b) and/or (d). Similarly, the application of labels to the outside surface of the cylindrical body is possible by adhesive bonding in the conventional manner.

The advantages of the container according to the present invention over the prior art are substantial:

unlike conventional cans containing a metal foil, the container of the present invention has a cylindrical body which is entirely composed of plastics materials which can be completely destroyed by incineration or, in the course of time, by atmospheric agents, which is advantageous from the ecological point of view;

in comparison with conventional cans, the container according to the present invention is substantially lighter because of its entirely organic body. Thus, the weight (4–7 g) of a cylindrical body of the present invention having a volume of 330 cm is much lower than that of a similar cylindrical body of tin plate (about 35 g), of aluminum (about 13 g) and a similar cylindrical body according to U.S. Pat. No. 3,687,351 made of aluminum and carboard (11.3 g), thus providing a substantial saving of raw materials and a very advantageous ratio of dead weight to useful weight;

as an unexpected advantage, because of the low relative weight of its cylindrical body, the container according to the present invention, when provided only with its bottom closure, i.e. when it is about to be filled with the carbonated beverage; has a very low center of gravity; this very low center of gravity ensures exceptional stability of the container in the vertical position in the filling machines, this stability being far greater than that of conventional cans, the cylindrical body of which is heavier than that of the present invention, thus making it possible to achieve at least the same rate of filling of the cans with the beverage which is to be preserved;

at the present time, all forms of pollution and, in particular, noise are being vigorously combated. We have now found that, in the production of the body and of the container of the present invention and also in the course of its filling with a pressurized beverage, the noise of the machines is greatly reduced as compared with that when filling conventional cans, this being due to the acoustic insulating properties of the material used for the construction of the container according to the present invention.

In the accompanying drawings, which are given for the purpose of illustrating the present invention.

It should be noticed that the container according to the invention has been represented in the accompanying drawings in the form of a can with a cylindrical vertical body closed with a horizontal lid and bottom. It is however to be understood that within the scope of the present invention, the essential characteristic resides in the cylindrical body, which is entirely made of plastics material and that the closing upper and lower elements can be of any kind whatsoever. Thus these closing elements may for example consist of simple heat-sealed joints. Furthermore, the container constructed with the cylindrical body according to the invention might comprise as upper closing lid any means allowing the delivery of the contents of the container in the form of a sausage, an aerosol, or the like. In other words, the container constructed with the cylindrical body according to the invention, besides its particular use as a container for pressurized carbonated beverage, can also be used for the preservation of liquids, pastes, suspensions, under pressure, not only in the foodstuffs sector, but also in many other commercial sectors belonging to the pharmaceutical, phytopharmaceutical, cosmetic and other fields. Furthermore, since the containers constructed with the cylindrical body according to the invention are particularly designed so as to resist to high pressures, it is evident that they are all the more suitable for packing products under normal pressure, in particular preserved foodstuffs, still liquids such as uncarbonated beverages, vegetable, animal or even mineral oils, unpressurized hair lotions and the like.

The following Examples are given for the purpose of illustrating the present invention:

EXAMPLE 1

Figure 1:
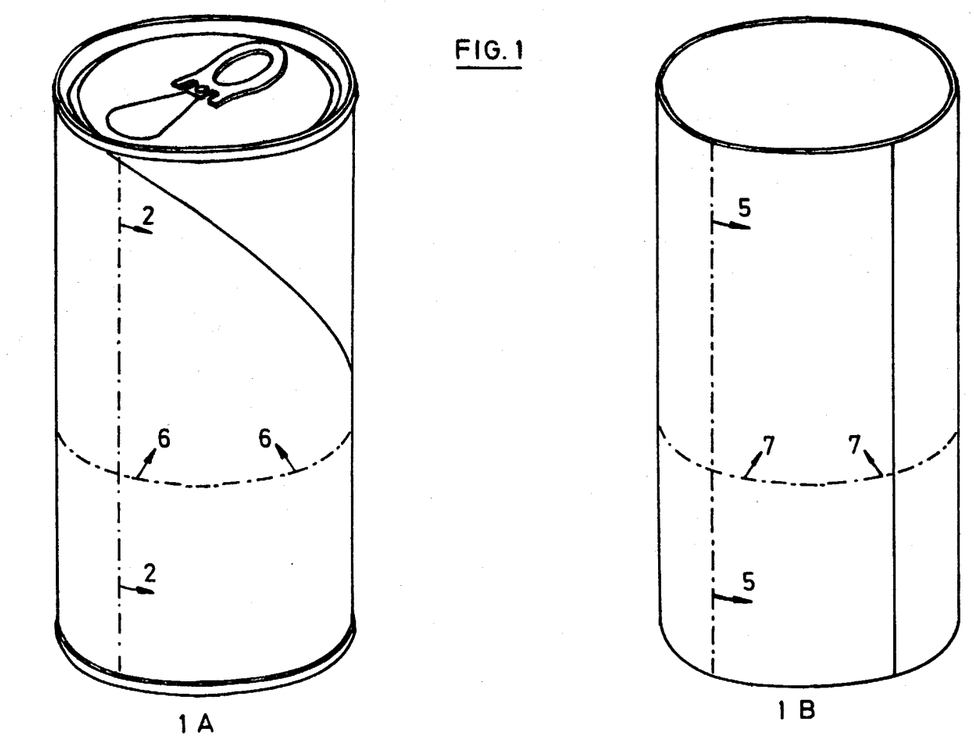
FIG. 1 is a perspective view of a closed can, the cylindrical body of which, according to the present invention, has been produced by the spiral winding technique (FIG. 1A); and also of a cylindrical body shown without a lid and produced according to the convolute winding technique (FIG. 1B)
Figures 2, 3, 4, 5:
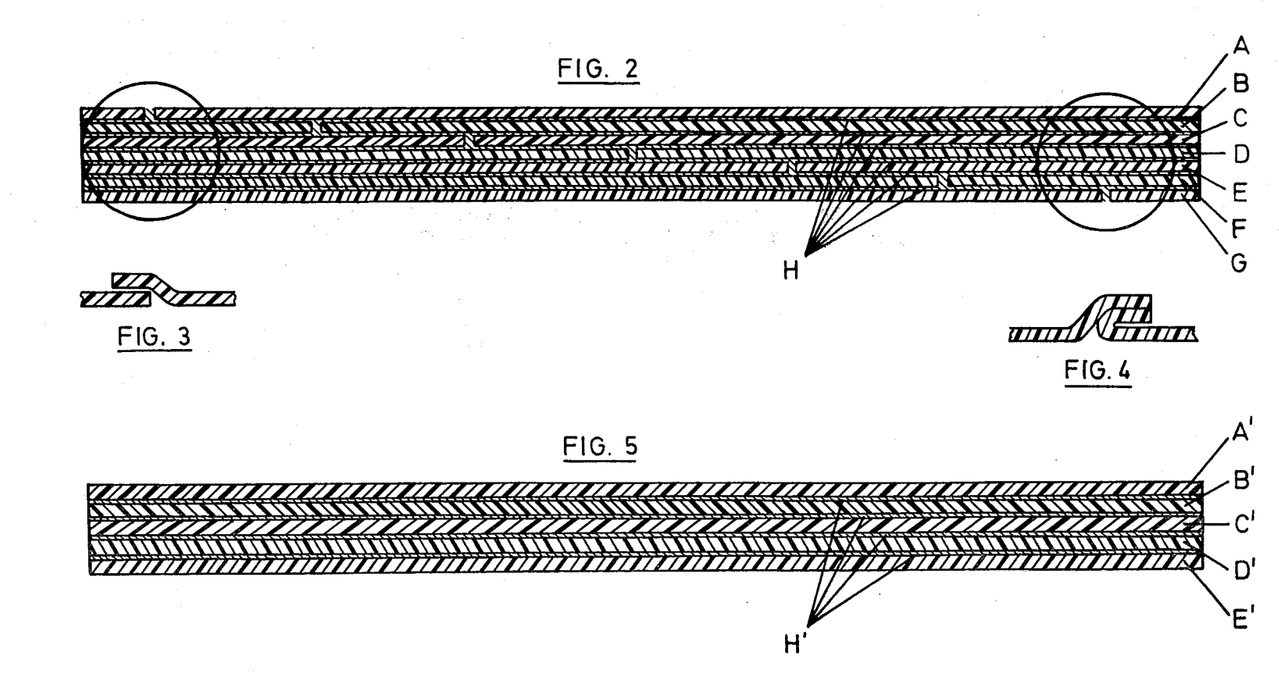
FIG. 2 is a longitudinal sectional view along the line 2—2 in FIG. 1A.
FIGS. 3 and 4 show modified forms of the connection joints of FIG. 2, these joints being made in the course of the spiral winding operation.
FIG. 5 is a longitudinal sectional view along the line 5—5 in FIG. 1B.
Figure 6:
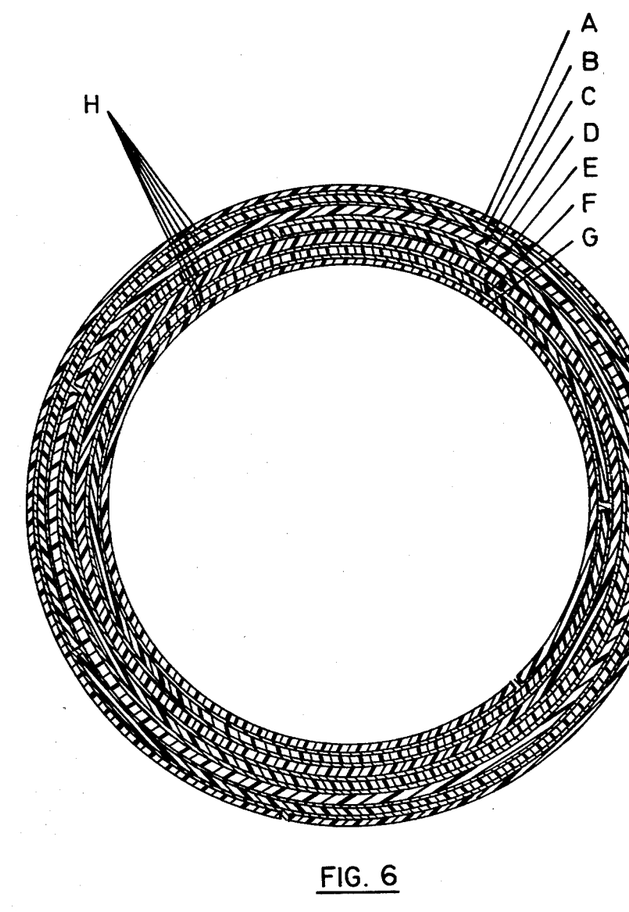
FIG. 6 is a cross-sectional view along the line 6—6 in FIG. 1A.

A cylindrical body for a can of the type shown in FIG. 1A is constructed by the known spiral winding technique, with a spiral winding angle of about 30° C. As shown in FIG. 2, which is a longitudinal section along the line 2—2 in FIG. 1A, it can be seen that the wall of the cylindrical body has the following composition:

layers A, B, C, E, F and G of element (b) according to the present invention, the element (b) being composed of biaxially oriented films of polyethylene terephthalate (known commercially under the name Mylar A (du PONT), with a nominal thickness of 23 microns;

a layer D of element (a) according to the present invention, the element (a) being composed of a biaxially oriented film of polyvinyl alcohol coated with a polyvinylidene chloride varnish on both faces and having a nominal thickness of 15 microns, this film being the commercial product Emblar OV sold by Unitika;

layers H of element (c) according to the present invention, the element (c) being composed of an adhesive of the hot melt type, each layer H having a thickness of about 10 microns, The holt melt adhesive used as element (c) has the following composition:

(1)
- 60 parts by weight of microcrystalline wax (M.P. 82° C.) (Be Square 180–185 of Bareco);
- 30 parts by weight of a 72:28 ethylene-vinyl acetate copolymer, density: 0.953; melt index: 1.2 (EVA-508 of Union Carbide);
- 10 parts by weight of alpha-methylstyrene/vinyltoluene resin, density: 1.04; M.P. 120° C. (Piccotex 120 of Pennsylvania Industrial Chemical Corporation).

The following two hot melt compositions can also be used as element (c):

(2)
- 40 parts by weight of polyethylene resin, density: 0.908; acid number: 5; ring and ball softening point: 106° C. (Epolene C 16 of Eastman Chemical Products);
- 40 parts by weight of hydrogenated microcrystalline wax, drop melting point (ASTM D 127): 76° C. (Mobilwax 2360 of Mobil);
- 20 parts by weight of hydrogenated rosin pentaerythritol ester, density: 1.07; Hercules drop softening point: 102°–110° C. (Pentalyn H of Hercules);

(3)
- 40 parts by weight of amorphous polypropylene resin, density: 0.86; softening point: 107° C. (Epolene M5W of Eastman Chemical Products);
- 50 parts by weight of microcrystalline wax, melting point (ASTM D 127): 88° C. (Multiwax 195M of Witco Chemical);
- 10 parts by weight of terpenic resin based on beta-pinene, density: 0.98; softening point: 135° C. (Piccolyte S 135 of Pennsylvania Industrial Chemical Corporation).

EXAMPLE 2

As shown in FIG. 2, the wall of the cylindrical body has the following composition:

layers A, B, F and G of element (b) of biaxially oriented polyethylene terephthalate film (Melinex S of ICI), with a nominal thickness of 23 microns;

layers C, D and E of element (a) of regenerated cellulose film varnished on both faces with a coating of polyvinylidene chloride (film 340 XS of UCB-SIDAC), with a weight of 34 g/m², i.e. a thickness of about 21 microns;

layers H of element (c), this being the hot-melt adhesive mentioned under (2) in Example 1, each layer H having a thickness of about 10 microns.

EXAMPLE 3

As shown in FIG. 2, the wall of the cylindrical body has the following composition:

layers A, B, C, E, F and G of element (b) of biaxially oriented polyethylene terephthalate film (Terphane H of Cellophane Francaise), with a nominal thickness of 23 microns;

a layer D of element (a) of a film of a completely saponified 25:75 ethylene-vinyl acetate copolymer, M.P. 180° C.; glass transition point: 74° C.; melt index 1.1 (Eval of Kuraray), with a nominal thickness of 25 microns;

layers H of element (c) of the hot-melt adhesive mentioned under (3) in Example 1, each layer H having a thickness of about 10 microns.

EXAMPLE 4

As shown in FIG. 2, the wall of the cylindrical body has the following composition:

layers A and G of element (b) of biaxially oriented polyester film (Mylar A of du PONT), with a nominal thickness of 23 microns;

a layer D of element (a) of a biaxially oriented polyvinyl alcohol film coated on both sides with a coating of polyvinylidene chloride (Emblar OV of Unitika), with a nominal thickness of 15 microns;

layers B, C, E and F of element (d) of biaxially oriented polypropylene film, density: 0.91 (Propafilm O of ICI), with a nominal thickness of 25 microns;

layers H of element (c) of the hot melt adhesive mentioned under (1) in Example 1, each layer H having a thickness of about 10 microns.

Below is given an outline of the properties of packing cans constructed with the cylindrical bodies of the compositions given in Examples 1 to 4 above. In order to permit comparison, these cans all have a diameter of 6.3 cm and a height of 12 cm.

The internal pressure which the cans can withstand is given by the following equation:

$$S = \frac{P \times D}{2 \times d}$$

in which
S = threshold of elastic elongation (in kg/cm²)
P = internal pressure (in kg/cm²)
D = diameter of can (in cm)
d = thickness of wall (in cm)

The maximum tolerable internal pressure at 70° C. (pasteurization temperature) for a body wound spirally with an angle of 30° is given by the following equation, the value of S being known by measurement for each cylindrical body of Examples 1 to 4;

$$P = \frac{2 \times d \times S}{D}$$

The results shown in the following Table are thus obtained:

| Composition | Elastic elongation threshold at 70° C. in kg/cm² | Wall thickness in μm | Maximum P kg/cm² | CO₂ content of beverage g/liter |
|---|---|---|---|---|
| Example 1 | 1800 | 213 | 12.17 | 8 |
| 2 | 1200 | 215 | 8.19 | 6 |
| 3 | 1600 | 223 | 11.33 | 7.5 |
| 4 | 1400 | 221 | 9.82 | 6.5 |

By way of explanation, it being assumed, for example, that the threshold of elastic elongation of the spiral wound body of Example 1, which has a thickness of 0.0213 cm., is 1800 kg/cm², this means that the maximum tolerable pressure at 70° C. (pasteurization temperature) is:

$$P = \frac{2 \times d \times S}{D} = \frac{2 \times 0.0213 \times 1800}{6.3} = 12.17 \text{ kg/cm}^2$$

The pressure corresponds to that of a carbonated beverage having a carbon dioxide content of 8 g/liter.

EXAMPLE 5

Figures 7, 8:
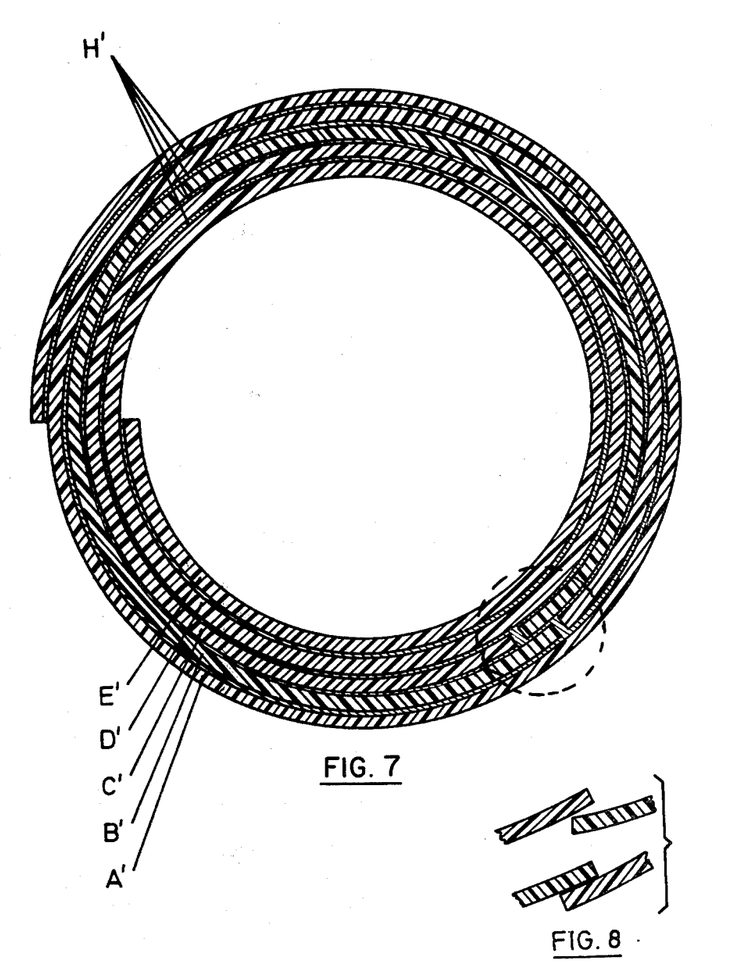
FIG. 7 is a cross-sectional view along the line 7—7 in FIG. 1B.
FIG. 8 shows a modified form of the connection joint of FIG. 7, produced by the convolute winding technique.

This example relates to a cylindrical body according to the present invention, the structure of which is obtained by convolute winding (see FIGS. 1B, 5 and 7). This structure has the following composition:

layers A', C', D' and E' of element (b) of biaxially oriented polyester film (Mylar A of du PONT) with a nominal thickness of 35 μm;

a layer B' of element (a) of biaxially oriented polyvinyl alcohol film coated on both faces with a polyvinylidene chloride based varnish (Emblar OV of Unitika), with a nominal thickness of 15 μm;

layers H' of element (c) of the hot-melt adhesive mentioned under (1) in Example 1, each layer having a thickness of about 10 microns. For a can with a diameter of 6.3 cm and a height of 12 cm, the following values are obtained:
elastic elongation threshold at 70° C.: 1800 kg/cm²
wall thickness: 195 μm
P. max.: 11.14 kg/cm²
carbon dioxide content of beverage: 7.5 g/liter.

EXAMPLE 6

In the preceding Examples 1 to 5, the maximum performance of a cylindrical body according to the invention has been calculated for the construction of a standard can having a diameter of 6.3 cm and a height of 12 cm.

It is also possible to calculate the wall thickness as a function of the potential pressure of the packed liquid for a given can diameter.

The equation mentioned in Example 4 can also be written as follows:

$$d = \frac{P \cdot D}{2S}$$

wherein
d = thickness of wall (in cm)
P = internal pressure (in kg/cm²)
D = diameter of can (in cm)
S = elastic elongation threshold (in kg/cm²)

It can be seen from this equation that the wall thickness (d) must be increased when the diameter (D) of the can and/or the pressure (P) within this can are increased.

The pressure (P) within the can depends on the amount of dissolved gas in the packed liquid as well as on the temperature to which the liquid within the can will be subjected. For example, a beer normally contains 5 g $CO_2$/liter. If the beer is not intended to be subjected to a pasteurization treatment, the internal pressure reaches a maximum of about 4 kg/cm² for a maximum storage temperature of 40° C. On the other hand, if the beer can has to be subjected to a pasteurization operation, the temperature will reach at most 70° C. and the maximum internal pressure (P) about 7 kg/cm². The wall thickness of the cylindrical body of the can might thus in the first case be smaller than in the second.

In Examples 6.1 to 6.5, the following abbreviations of products are used:

Emblar OV = biaxially oriented polyvinyl alcohol film coated on both sides with a polyvinylidene chloride coating cited in Example 1 (element a).

PAN = polyacrylonitrile film (Barex 210 of Lonza) obtained from 70% by weight of 80:20 acrylonitrile-methyl acrylate copolymer and 30% by weight of 40:60 acrylonitrile-butadiene elastomer copolymer.

Saran = film obtained from 85:13:2 vinylidene chloride-vinyl chloride-acrylonitrile copolymer sold by DOW (element a).

PETP = biaxially oriented polyethylene terephthalate film (Mylar of du PONT) (element b).

Hot-melt = adhesive mentioned under (1) in Example 1 (element c).

Tyvek 1073 = "spun-bonded" synthetic paper foil obtained from high density polyethylene fibres sold by du PONT (element d).

EXAMPLE 6.1

Conditions: beer with 5 g $CO_2$/liter ($P_{maximum}$ = 4 kg/cm²)
no pasteurization
diameter of can = 40 mm
PETP having at 40° C. an elastic elongation threshold of 1870 kg/cm²

For this PETP, $d = \frac{P \cdot D}{2S} = \frac{4 \times 4}{2 \times 1870} = $ about 0.0043 cm or 43 microns.

The cylindrical body is constructed by spiral winding using as barrier layer an Emblar OV film of 15 microns (element a), PETP films of 12 microns (element b) and hot-melt layers of 12.5 microns (element c). Consequently, four layers of element (b) (4 × 12 = 48 microns) should be used.

But, since the 15 microns film of element (a) has mechanical characteristics which are superior to those of a 12 microns film of element (b), the possibility of using only three films of element (b) instead of 4 might be contemplated. However, in the abutting spiral winding technique, the outer layer does not contribute to the mechanical characteristics. Under these circumstances, it will all the same be necessary to use four layers of PETP of 12 microns each.

The wall of the cylindrical body thus comprises the following layers, from inside to outside:
1. PETP: 12 microns
2. hot-melt: 12.5 microns
3. PETP: 12 microns
4. hot-melt: 12.5 microns 5. Emblar OV: 15 microns
6. hot-melt: 12.5 microns
7. PETP: 12 microns
8. hot-melt: 12.5 microns
9. PETP: 12 microns i.e. nine layers with a total wall thickness of the cylindrical body of 113 microns.

EXAMPLE 6.2

Conditions: beer with 5 g $CO_2$/liter ($P_{max}=4$ kg/cm$^2$)
no pasteurization
diameter of can = 40 mm
PETP having at 40° C. an elastic elongation threshold of 1870 kg/cm$^2$ The difference with Example 6.1 is that the cylindrical body is constructed by convolution. As in Example 6.1, four layers of element (b) (4×12=48 microns) are necessary. But since the film of element (a) of 15 microns has superior mechanical properties as compared with a 12 microns film (b), the (a) film layer can be counted as an equivalent of one of the (b) film layers. Moreover, since in a cylindrical body constructed by convolution, contrary to a similar body constructed by spiral winding, all the PETP layers take part in the mechanical characteristics, only three PETP layers, instead of four, will be necessary. The element (a) is protected from the outside and the inside of the cylindrical body by 35 microns of element (c) in one or two layers.

The wall of the cylindrical body thus comprises the following layers, from inside to outside:
1. PETP: 12 microns
2. hot-melt: 17.5 microns
3. PETP: 12 microns
4. hot-melt: 17.5 microns
5. Emblar OV: 15 microns
6. hot-melt: 35 microns
7. PETP: 12 microns i.e. seven layers forming a cylindrical body with a total wall thickness of 121 microns.

EXAMPLE 6.3

Conditions: beer with 5 g $CO_2$/liter ($P_{max}=4$ kg/cm$^2$)
no pasteurization
diameter of can = 100 mm
PETP having at 40° C. an elastic elongation threshold of 1870 kg/cm$^2$ For this PETP, $d = \frac{P \cdot D}{2S} = \frac{4 \times 10}{2 \times 1870} =$ about 0.0107 cm or 107 microns, which is equivalent to 3 PETP films of 36 microns each.

The cylindrical body of the can is realized by convolution. In order that layer (a) of PAN be a 100% efficaceous barrier towards oxygen and carbon dioxide, it should have a thickness of 250 microns. The mechanical characteristics of such a film (a) of 250 microns are far superior to those of a film of PETP (b) of 36 microns. Therefore, only two layers of element (b) instead of three are used. Finally, in order to efficaceously protect the PAN film from humidity, it is isolated from the outside and the inside of the cylindrical body by a thickness of hot-melt (element c) of 30 microns. Under these circumstances, the wall of the cylindrical body comprises the following layers, from inside to outside:

1. PETP: 36 microns
2. hot-melt: 30 microns
3. PAN: 250 microns
4. hot-melt: 30 microns
5. PETP: 36 microns i.e. five layers forming a cylindrical body wall with a total thickness of 382 microns.

EXAMPLE 6.4

Conditions: beer with 5 g $CO_2$/liter ($P_{max}=7$ kg/cm$^2$)
pasteurization
diameter of can = 100 mm
PETP having at 70° C. an elastic elongation threshold of 1800 kg/cm$^2$ For this PETP, $d = \frac{7 \times 10}{2 \times 1800} = 0.0194$ cm or 194 microns.

The cylindrical body is realized by convolution using as element (a) an Emblar OV film of 15 microns and as element (b) PETP films of 36 microns. Since the film (a) has mechanical properties which are superior to those of film (b) of the same thickness, the thickness of the Emblar OV film (a) (15 microns) can be subtracted from the necessary thickness of the PETP layers (b), i.e. the PETP layers must have a total thickness of 194−15=179 microns and thus 179/36=5 films of (b) will be necessary. Furthermore, film (a) is protected from the inside and the outside of the cylindrical body by a total thickness of 30 microns of element (c) divided into 2 or 3 layers. Thus the wall of the cylindrical body comprises the following layers, from inside to outside:
1. PETP: 36 microns
2. hot-melt: 10 microns
3. PETP: 36 microns
4. hot-melt: 10 microns
5. PETP: 36 microns
6. hot-melt: 10 microns
7. Emblar OV: 15 microns
8. hot-melt: 15 microns
9. PETP: 36 microns
10. hot-melt: 15 microns
11. PETP: 36 microns i.e. eleven layers forming a cylindrical body wall with a total thickness of 255 microns.

EXAMPLE 6.5

Conditions: lemonade with 6 g $CO_2$/liter ($P_{max}=5$ kg/cm$^2$)
no pasteurization
diameter of can = 65 mm
PETP having at 40° C. an elastic elongation threshold of 1870 kg/cm$^2$ For this PETP, $d = \frac{5 \times 6.5}{2 \times 1870} = 0.0087$ cm or 87 microns.

The cylindrical body is realized by convolution using as element (a) two films of Saran, having each a thickness of 51 microns. The films of element (a) are protected from the inside and the outside of the cylindrical body by a total thickness of element (c) of 25 microns in one or two layers. Furthermore, the two films of element (a) are separated from each other by a layer of element (c) of 10 microns.

As element (b), films of PETP of 19 microns are used. To obtain the necessary 87 microns, 87/19=5 films should normally be used.

Since each film of Saran (element a) of 51 microns has mechanical properties which are equivalent to those of a PETP film of 19 microns, the two Saran films can replace two out of 5 of the PETP films and only three more of these remain necessary.

Furthermore, a film of Tyvek 1073 of 200 microns (element d) is used because of its decorative effect. This has mechanical characteristics which are superior to those of a 19 microns PETP film. Thus, one more of the three remaining PETP films can be replaced, leaving only two PETP films.

The wall of the cylindrical body finally comprises the following layers, from inside to outside:
1. PETP: 19 microns
2. hot-melt: 25 microns
3. Saran: 51 microns
4. hot-melt: 10 microns
5. Saran: 51 microns
6. hot-melt: 12.5 microns
7. PETP: 19 microns
8. hot-melt: 12.5 microns
9. Tyvek 1073: 200 microns i.e. nine layers forming a cylindrical body wall with a total thickness of 400 microns.

We claim:

1. A container for packaing pressurized carbonated beverages having a cylindrical body provided with top and bottom end closures at the opposite ends thereof, said cylindrical body comprising:
(a) at least one film of a synthetic or semi-synthetic organic polymer having a permeability of oxygen lower than $6 \times 10^{-13}$ ml.cm/cm$^2$.sec.cm of mercury at 25° C. and 0% relative air humidity;
(b) at least two films of a polyester; and
(c) at least two layers of an organic thermoplastic binder having a permeability to water vapor lower than $1 \times 10^{-14}$ g.cm/cm$^2$.sec.cm of mercury at 38° C. and 90% relative air humidity,
all the films of (a) and (b) being adhesively bonded together by means of the binder of (c) in the form of a cylindrical body, the wall of which has a spirally or convolutely-wound structure, in which each film of (a) is separated both from the outside surface and from the inside surface of the cylindrical body by at least one film of (b) and at least one layer of (c).

2. A cylindrical container body for packaging pressurized carbonated beverages comprising:
(a) at least one film of a synthetic or semi-synthetic organic polymer having a permeability to oxygen lower than $6 \times 10^{-13}$ ml.cm/cm$^2$.sec.cm of mercury at 25° C. and 0% relative air humidity;
(b) at least two films of a polyester; and
(c) at least two layers of an organic thermoplastic hot melt binder comprising a water-repellant wax, said binder having a permeability to water vapor lower than $1 \times 10^{-14}$ g.cm/cm$^2$.sec.cm of mercury at 38° C. and 90% relative air humidity,
all the films of (a) and (b) being adhesively bonded together by means of the binder of (c) in the form of a cylindrical body, the wall of which has a spirally or convolutely-wound structure, in which each film of (a) is separated both from the outside surface and from the inside surface of the cylindrical body by at least one film of (b) and at least one layer of (c), the total thickness of element (a) being within the range of from 10 to 250 microns, the total thickness of element (b) being within the range of from 35 to 250 microns and the total thickness of element (c) being within the range of from 40 to 70 microns.

3. The cylindrical container body according to claim 1, wherein the synthetic or semi-synthetic organic polymer is polyvinyl alcohol, a vinyl alcohol copolymer containing at least 70% by weight vinyl alcohol units, regenerated cellulose, polyacrylonitrile, an acrylonitrile copolymer containing at least 65% by weight acrylonitrile units, polymethacrylonitrile, a methacrylonitrile copolymer containing at least 65% by weight methacrylonitrile units or a vinylidene chloride copolymer containing at least 85% by weight vinylidene chloride units.

4. The cylindrical container body according to claim 1, wherein the synthetic organic polymer is polyvinyl alcohol or a vinyl alcohol copolymer containing at least 70% by weight vinyl alcohol units, the total thickness of element (a) being from 10 to 80 microns.

5. The cylindrical container body according to claim 1, wherein the polyester is a polycondensation product of terephthalic acid with an alkylene glycol selected from the group consisting of ethylene glycol, butylene glycol and cyclohexylene-1,4-dimethanol.

6. The cylindrical container body according to claim 1, wherein the total thickness of element (b) in the cylindrical body is from 35 to 180 microns.

7. The cylindrical container body according to claim 1, wherein the water-repellent wax is a paraffin wax or a microcrystalline wax.

8. The cylindrical container body according to claim 1, wherein the organic thermoplastic binder comprises in addition a synthetic polymer selected from the group consisting of polyethylene, an ethylene-vinyl acetate copolymer, an ethylene-propylene-diene terpolymer, polyisobutylene, polypropylene, a polyamide and a polyester.

9. The cylindrical container body according to claim 1, wherein the organic thermoplastic binder comprises in addition a low molecular weight natural or synthetic adhesive resin selected from the group consisting of polyterpenes, phenolic terpenes, terpene-urethane resins, phenolic resins, natural or modified rosin and resinous styrene copolymers.

10. The cylindrical container body according to claim 1, wherein the organic thermoplastic binder has a softening temperature of at least 60° C.

11. The cylindrical container body according to claim 10, wherein the organic thermoplastic binder has a softening temperature of at least 80° C.

12. The cylindrical container body according to claim 1, wherein the total thickness of element (c) in the cylindrical body is from 50 to 65 microns.

13. The cylindrical container body according to claim 1, further comprising an element (d) consisting of at least one film of, biaxially oriented polypropylene, or a paper at least partially constituted of synthetic fibers as a spun-bonded film, said element (d) having a total thickness up to 200 microns.

14. The cylindrical container body according to claim 1, wherein the total thickness of its wall is from 85 to 770 microns.

15. The cylindrical container body according to claim 14, wherein the total thickness of its wall is from 100 to 400 microns.

16. The cylindrical container body according to claim 1, wherein the film of element (a) is a biaxially oriented film of polyvinyl alcohol coated on both faces with a polyvinylidene chloride varnish.

17. The cylindrical container body according to claim 1, wherein the film of element (a) is a film of regenerated cellulose coated on both faces with a polyvinylidene chloride varnish.

18. The cylindrical container body according to claim 1, wherein the film of element (a) is a film of a completely saponified 25:75 ethylene-vinyl acetate copolymer.

19. The cylindrical container body according to claim 1, wherein the film of element (a) is a film composed of 70% by weight of a 80:20 acrylonitrile-methyl acrylate copolymer and 30% by weight of a 40:60 acrylonitrilebutadiene elastomer copolymer.

20. The cylindrical container body according to claim 1, wherein the film of element (a) is a film of 85:13:2 vinylidene chloride-vinyl chloride-acrylonitrile copolymer.

21. The cylindrical container body according to claim 1, wherein the films of element (b) are films of biaxially oriented polyethylene terephthalate.

* * * * *